Aug. 11, 1953 — E. H. HOLTZ ET AL — 2,648,114
MEASURING TAPE FASTENER
Filed Sept. 12, 1950
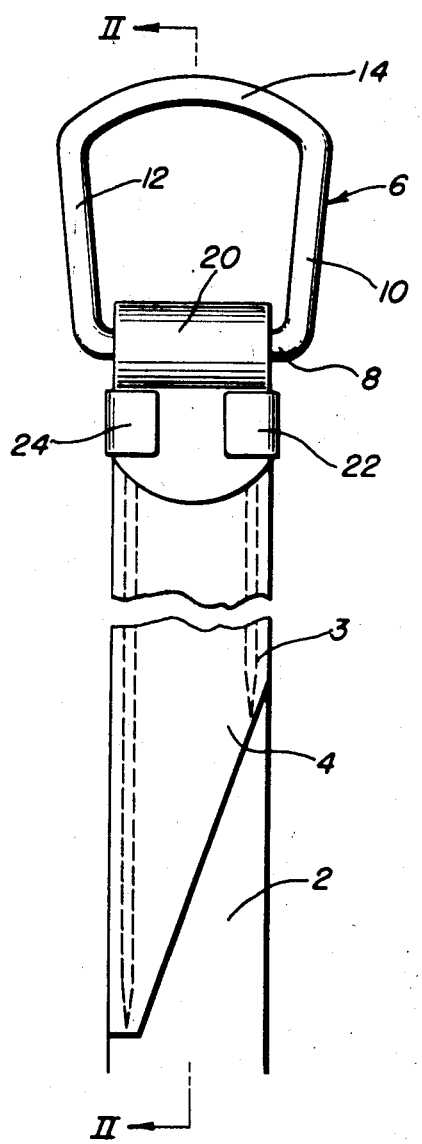
Fig. I
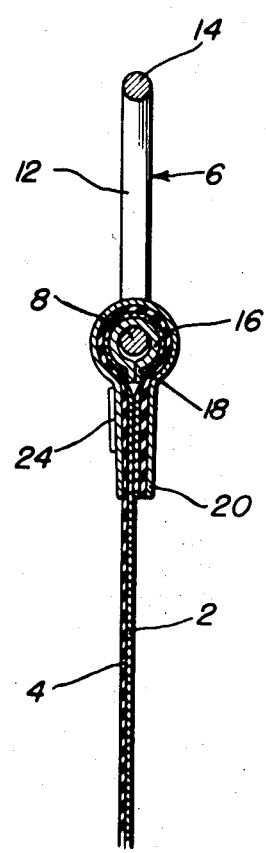
Fig. II
INVENTORS.
EDWARD H. HOLTZ
BY CARL R. SELLEN
ATTORNEY Patented Aug. 11, 1953

2,648,114

UNITED STATES PATENT OFFICE 2,648,114

MEASURING TAPE FASTENER

Edward H. Holtz, Teaneck, and Carl R. Sellen, North Bergen, N. J., assignors to Keuffel & Esser Company, Hoboken, N. J., a corporation of New Jersey Application September 12, 1950, Serial No. 184,505

3 Claims. (Cl. 24—265)

This invention relates to an end ring for woven measuring tapes.

The objects of the invention are to provide means for securely fastening an end ring to a woven measuring tape, to accomplish this purpose without perforating the woven measuring tape and to prevent slipping of the measuring tape from within the fastening means so that it will not become disengaged from the ring.

These and other objects of the invention and the means for their attainment will be more fully understood from the following description taken in connection with the accompanying drawing in which:

Fig. I is a view in plan of a measuring tape provided with the new end ring.

Fig. II is a view in sectional elevation taken along the line II—II of Fig. I and looking in the direction of the arrows.

Referring to the drawing, the measuring tape 2 is of the woven type (i.e. made by weaving fibers to form a woven fabric strip, coating and printing with lines and numbers). A reenforcing strip 4 is secured to the measuring tape 2 as by a double row of stitching 3 along both edges as shown. The reenforcing strip 4 is diagonally cut as shown and is preferably made of plastic, rubber-like or other resilient or semi-resilient material.

The ring 6 may conveniently take the form shown having a straight portion 8, two additional straight portions 10 and 12 making an oblique angle with the straight portion 8 and an arcuate portion 14 joining the straight portions 10 and 12. The ring 6 will normally be bent from wire so that the ends come together at the center of the straight portion 8. These ends may or may not be joined together by soldering, brazing or the like.

A tubular member 16 shown in Fig. II covers the straight portion 8 of the end ring 6 and is provided with a projection 18. The tubular member 16 may be made by passing a piece of flat material preferably metal through the ring 6 and bending it into a tubular form to conform generally to the surface of the straight portion 8 of the ring 6 which is preferably of circular cross section. The ends of the strip forming the tubular member 16 are bent to contact each other as shown and to extend outward from the ring 6 to form the projection 18.

The measuring tape 2 provided with the reenforcing strip 4 passes through the ring 6 and covers the surface of the tubular member 16 and the end contacts the tape after passing through the ring 6. A sheet metal piece 20 passes through the ring 6 and covers the measuring tape 2. The metal piece 20 is bent to hold the tape 2 and reenforcing strip 4 rather tightly between itself and the tubular member 16. A pair of ears 22 and 24 are provided near one end of the metal strip 20 and are bent around the other end of the strip 20 to hold the doubled thickness of the measuring tape 2 and reenforcing strip 4 tightly together and compress them against the projection 18. The ends of the sheet metal piece 20 are preferably rounded as shown in Fig. I to eliminate sharp corners. The end of the tape 2 and reenforcing strip 4 are cut to conform to the rounded end of the metal strip 20.

The tubular member 16 provided with the projection 18 forms an important part of the present invention. Pulling on the measuring tape 2 while the end ring 6 is held would normally tend to cause the tape 2 to slide within the fastening means 20 and be pulled out of the ring 6. However in the construction shown this tendency of the measuring tape 2 to move within the fastening means 20 will tend to rotate the tubular member 16 by frictional contact and cause the projection 18 to compress the measuring tape 2 and reenforcing strip 4 against the outer metal piece 20. In other words the tubular member 16 provided with the projection 18 imparts a self-locking feature to the end ring construction.

An important feature of the invention is that the self-locking construction for securely holding the measuring tape to the end ring is accomplished without putting a hole through the tape. If it were necessary to put a hole through the tape, the tape would be weakened considerably since the fibers of the woven fabric strip would have to be broken, thereby tending to weaken the whole woven structure.

It will be understood that the measuring tape 2 may be joined to the end ring 6 so that the tape markings will start from a zero reading at the portion 14 of the end ring or from any other desired position.

Having thus described the invention, what is claimed is:

1. An end ring construction for a measuring tape comprising a ring, a tubular member covering a portion of said ring and having a projection, a measuring tape passing through said ring covering the surface of said tubular member and a piece of sheet metal passing through said ring and covering said measuring tape, said piece of sheet metal having a pair of ears near one end, said ears being bent around the edge of the measuring tape to engage the other end of said piece of sheet metal to compress said measuring tape against itself and against said projection on said tubular member, said projection on said tubular member being keyed between the ends of said piece of sheet metal.

2. An end ring construction for a measuring tape comprising a ring, a tubular member covering a portion of said ring and being made up of a piece of flat material passing through said ring and bent to conform generally to the surface of said ring and having its ends in contact and extending outward from said ring to form a projection, a measuring tape passing through said ring covering the surface of said tubular member and a piece of sheet metal passing through said ring and covering said measuring tape, said piece of sheet metal having a pair of ears near one end, said ears being bent around the edge of the measuring tape to engage the other end of said piece of sheet metal to compress said measuring tape against itself and against said projection on said tubular member, said projection on said tubular member being keyed between the ends of said piece of sheet metal.

3. An end ring construction for a measuring tape comprising a ring, a tubular member covering a portion of said ring and having a projection, a measuring tape passing through said ring covering the surface of said tubular member, a reenforcing strip secured to said measuring tape in the region where it passes through said ring and covers said tubular member and a piece of sheet metal passing through said ring and covering said measuring tape, said piece of sheet metal having a pair of ears near one end, said ears being bent around the edge of the measuring tape to engage the other end of said piece of sheet metal to compress said measuring tape against itself and against said projection on said tubular member, said projection on said tubular member being keyed between the ends of said piece of sheet metal.

EDWARD H. HOLTZ.
CARL R. SELLEN.

References Cited in the file of this patent

UNITED STATES PATENTS

| Number | Name | Date |
| --- | --- | --- |
| 54,504 | Cissna | May 8, 1866 |
| 276,834 | Laverty | May 1, 1883 |
| 353,851 | Fountain | Dec. 7, 1886 |
| 372,196 | Bernstein | Oct. 25, 1887 |
| 626,196 | Thomson | May 30, 1899 |
| 850,240 | Middleton | Apr. 16, 1907 |

FOREIGN PATENTS

| Number | Country | Date |
| --- | --- | --- |
| 257,433 | Germany | Mar. 5, 1913 |